United States Patent
Teraoka et al.

(10) Patent No.: US 6,726,862 B2
(45) Date of Patent: Apr. 27, 2004

(54) METHOD FOR FORMING THERMOPLASTIC RESIN FOAM

(75) Inventors: Atsuo Teraoka, Hiroshima (JP); Fumiaki Tsuda, Hiroshima (JP); Hideo Ohyabu, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 261 days.

(21) Appl. No.: 09/800,471

(22) Filed: Mar. 8, 2001

(65) Prior Publication Data
US 2001/0008316 A1 Jul. 19, 2001

(51) Int. Cl.[7] .............................................. B29C 44/02
(52) U.S. Cl. .......................... 264/40.5; 264/50; 264/53; 264/69
(58) Field of Search ........................ 264/40.5, 50, 53, 264/69

(56) References Cited

U.S. PATENT DOCUMENTS

| 4,615,669 A | * | 10/1986 | Fujita et al. | 425/147 |
| 4,950,144 A | * | 8/1990 | Watanabe et al. | 425/135 |
| 5,158,986 A | * | 10/1992 | Cha et al. | 521/82 |
| 5,334,356 A | * | 8/1994 | Baldwin et al. | 422/133 |
| 5,997,781 A | * | 12/1999 | Nishikawa et al. | 264/45.1 |
| 6,005,013 A | * | 12/1999 | Suh et al. | 521/79 |
| 6,322,347 B1 | * | 11/2001 | Xu | 425/376.1 |

FOREIGN PATENT DOCUMENTS

| JP | 8-258096 | 10/1996 | ........... B29C/45/46 |
| JP | 10-230528 | 9/1998 | ........... B29C/45/00 |

* cited by examiner

Primary Examiner—Allan R. Kuhns
(74) Attorney, Agent, or Firm—Sughrue Mion, PLLC

(57) ABSTRACT

The present invention relates to the step of plasticizing a thermoplastic resin material by rotatably driving a screw (20). Also included in the method is the step of injecting an inert gas into a screw cylinder (1) to permeate the melted resin and injecting the melted resin into a mold by driving the screw (20) in the direction of injection. Here, the inert gas has a pressure, at least in pressure, equal to or greater than a supercritical pressure or is under a supercritical state. To provide a thermoplastic resin foam by the method, electric servomotors (31, 32) are employed to drive the screw (20). After the step of plasticizing the resin material has been completed, brakes are applied to the electric servomotors (31, 32) to prevent the screw (20) from retreating. Alternatively, even after the step of plasticizing the resin material has been completed, the screw (20) is driven at low speeds in the direction of plasticization until immediately before the step of injecting the melted resin is initiated. This allows foaming inside the screw cylinder (1).

10 Claims, 2 Drawing Sheets

METHOD FOR FORMING THERMOPLASTIC RESIN FOAM

BACKGROUND OF INVENTION

1. Field of Invention

The present invention relates to an apparatus and method for forming a thermoplastic resin foam. The apparatus comprises a screw cylinder and a screw provided drivably in the directions of plasticization and injection inside said screw cylinder. The method comprises the step of injecting an inert gas such as a carbon dioxide gas or a nitrogen gas, having at least in pressure a pressure equal to or greater than a supercritical pressure into said screw cylinder. The method also comprises the steps of permeating melted resin with the inert gas under a supercritical state inside the screw cylinder, and injecting the melted resin, permeated by the inert gas, into a mold to provide a thermoplastic resin foam.

2. Related Art

There have been suggested many apparatuses and methods for molding a thermoplastic resin foam, for example, in Japanese Unexamined Patent Publication Hei 8-258096 and No. Hei. 10-230528. The methods include the steps of melting thermoplastic resin inside the cylinder of an injection-molding machine, permeating the melted thermoplastic resin with an inert gas such as carbon dioxide gas or nitrogen gas under a supercritical state, and injecting the melted resin, permeated by the gas, into the mold. The apparatus for forming a fine foam, disclosed in the aforementioned Japanese Unexamined Patent Publication Hei. 8-258096, is constructed in general as follows. That is, the apparatus comprises a heating cylinder, a main screw provided inside the heating cylinder, a mixing screw provided on the top end portion of the main screw, and an inert gas supply unit for supplying an inert gas to the mixing screw portion. Thus, when the main screw is rotatably driven to feed pelletized resin material toward the top end portion of the heating cylinder, the pelletized resin material is melted and then further uniformly melted with the mixing screw. At this time, when a carbon dioxide gas is supplied to the melted resin, the carbon dioxide gas permeates the melted resin material. Injecting the melted resin material permeated by the carbon dioxide gas into a mold by driving the main screw in the axial direction will provide a fine foam. On the other hand, the apparatus for forming a thermoplastic resin foam, disclosed in Japanese Unexamined Patent Publication Hei. 10-230528, is constructed as follows. That is, the apparatus comprises two separate units such as a successive plasticizing unit having a heating cylinder and a screw, and an injecting unit having a plunger. Thus, the two units can also provide a thermoplastic resin foam as follows. That is, when the screw is rotatably driven to melt the pelletized resin material and a carbon dioxide gas is supplied to the melted resin, the carbon dioxide gas permeates the melted resin material. The melted resin material permeated by the carbon dioxide gas is injected into the mold of the injecting unit having the plunger by driving the screw in the axial direction. Then, the plunger is driven to provide a thermoplastic resin foam in the same manner.

However, for example, the critical pressure of the carbon dioxide gas is 7.4 MPa. There is an unsolved problem of sealing the carbon dioxide gas inside the heating cylinder, which will arise when the carbon dioxide gas under a supercritical state with a pressure considerably higher than the aforementioned pressure is injected into the melted resin material inside the heating cylinder. Furthermore, the apparatus for forming a thermoplastic resin foam is complicated in structure and comparatively expensive.

SUMMARY OF INVENTION

The present invention was developed to provide a method for forming a thermoplastic resin foam, by which the aforementioned problems can be solved. More specifically, the object of the invention is to provide a method and an apparatus for forming a thermoplastic resin foam, by which foaming can be prevented inside the screw cylinder to provide a high-quality fine foam.

To achieve the aforementioned object, the present invention provides an apparatus for forming a thermoplastic resin foam, which is constructed as follows. That is, the apparatus comprises a screw cylinder having a material supply hole arranged near a rear end portion of one end of the screw cylinder, and an injection nozzle arranged on a top end portion of the other end of the screw cylinder. The apparatus also comprises a screw provided in said screw cylinder for being rotatably driven in directions of plasticization and injection, and a drive means for driving said screw in the directions of plasticization and injection. The apparatus is constructed such that said screw corresponds to said screw cylinder and is selected as a first metered, or plasticizing, portion, a low-pressure portion, and second metered, or plasticizing, portion in that order from the rear end portion to the top end portion. A gas supply hole for injecting an inert gas is disposed at a position corresponding to the low-pressure portion of said screw of said screw cylinder. The inert gas is a carbon dioxide gas or a nitrogen gas having, at least in pressure, a pressure equal to or greater than a supercritical pressure or under a supercritical state. Said drive means comprise an electric servomotor.

The present invention provides a method for forming a thermoplastic resin foam comprising the step of plasticizing a thermoplastic resin material by rotatably driving a screw provided drivably in directions of plasticization and injection inside a screw cylinder. The method also comprises the step of injecting melted resin, permeated by an inert gas, into a mold by driving said screw in the direction of injection after having injected the inert gas into said screw cylinder to allow the inert gas to permeate melted resin. Here, the inert gas is a carbon dioxide or a nitrogen gas having, at least in pressure, a pressure equal to or greater than a supercritical pressure or under a supercritical state. The method employs an electric servomotor as a drive means for driving said screw in the directions of plasticization and injection. After the step of plasticizing the thermoplastic resin material has been completed, said screw is also prevented from retreating by applying brake to said electric servomotor to thereby maintain a pressure at a supercritical pressure or more inside said screw cylinder.

The present invention provides a method for forming a thermoplastic resin foam comprising the step of plasticizing a thermoplastic resin material by rotatably driving a screw provided drivably in directions of plasticization and injection inside a screw cylinder. The method also comprises the step of injecting melted resin, permeated by an inert gas, into a mold by driving said screw in the direction of injection after having injected the inert gas into said screw cylinder to allow the inert gas to permeate melted resin. Here, the inert gas is a carbon dioxide or a nitrogen gas having, at least in pressure, a pressure equal to or greater than a supercritical pressure or under a supercritical state. The method employs an electric servomotor as a drive means for driving said screw in the directions of plasticization and injection.

Furthermore, the step of plasticizing the thermoplastic resin material is performed until immediately before the step of injecting the melted resin is initiated.

The present invention provides a method for forming a thermoplastic resin foam comprising the step of plasticizing a thermoplastic resin material by rotatably driving a screw provided drivably in directions of plasticization and injection inside a screw cylinder. The method also comprises the step of injecting melted resin, permeated by an inert gas, into a mold by driving said screw in the direction of injection after having injected the inert gas into said screw cylinder to allow the inert gas to permeate melted resin. Here, the inert gas is a carbon dioxide or a nitrogen gas having, at least in pressure, a pressure equal to or greater than a supercritical pressure or under a supercritical state. The method employs an electric servomotor as a drive means for driving said screw in the directions of plasticization and injection. Furthermore, even after the step of plasticizing the thermoplastic resin material has been completed, said screw is driven at low speeds in the direction of plasticization until immediately before the step of injecting the melted resin is initiated.

The present invention provides a method for forming a thermoplastic resin foam comprising the step of plasticizing a thermoplastic resin material by rotatably driving a screw provided drivably in directions of plasticization and injection inside a screw cylinder. The method also comprises the step of injecting melted resin, permeated by an inert gas, into a mold by driving said screw in the direction of injection after having injected the inert gas into said screw cylinder to allow the inert gas to permeate melted resin. Here, the inert gas is a carbon dioxide or a nitrogen gas having, at least in pressure, a pressure equal to or greater than a supercritical pressure or under a supercritical state. The method employs an electric servomotor as a drive means for driving said screw in the directions of plasticization and injection. Furthermore, when a pressure has dropped below a pre-set value inside said screw cylinder, said screw is driven in the direction of plasticization so as to stop said screw when the pressure becomes equal to or greater than the pre-set value. This is carried out to maintain the pressure at a supercritical pressure or more inside said screw cylinder.

The present invention provides a method for forming a thermoplastic resin foam comprising the step of plasticizing a thermoplastic resin material by rotatably driving a screw provided drivably in directions of plasticization and injection inside a screw cylinder. The method also comprises the step of injecting melted resin, permeated by an inert gas, into a mold by driving said screw in the direction of injection after having injected the inert gas into said screw cylinder to allow the inert gas to permeate melted resin. Here, the inert gas is a carbon dioxide or a nitrogen gas having, at least in pressure, a pressure equal to or greater than a supercritical pressure or under a supercritical state. The method employs an electric servomotor as a drive means for driving said screw in the directions of plasticization and injection. Furthermore, when said screw is driven in the direction of plasticization, driving said screw in the opposite direction of plasticization is intermittently combined therewith.

The present invention provides a method for forming a thermoplastic resin foam comprising the step of plasticizing a thermoplastic resin material by rotatably driving a screw provided drivably in directions of plasticization and injection inside a screw cylinder. The method also comprises the step of injecting melted resin, permeated by an inert gas, into a mold by driving said screw in the direction of injection after having injected the inert gas into said screw cylinder to allow the inert gas to permeate melted resin. Here, the inert gas is a carbon dioxide or a nitrogen gas having, at least in pressure, a pressure equal to or greater than a supercritical pressure or under a supercritical state. The method employs an electric servomotor as a drive means for driving said screw in the directions of plasticization and injection. Furthermore, during plasticization, said screw cylinder is provided with micro-vibration in the direction of injection.

To achieve the aforementioned object, the present invention provides an apparatus for forming a thermoplastic resin foam, which is constructed as follows. That is, the apparatus comprises a screw cylinder having a material supply hole arranged near a rear end portion of one end of the screw cylinder, and an injection nozzle arranged on a top end portion of the other end of the screw cylinder. The apparatus also comprises a screw provided in said screw cylinder for being rotatably driven in directions of plasticization and injection, and a drive means for driving said screw in the directions of plasticization and injection. The apparatus is constructed such that said screw corresponds to said screw cylinder and is selected as a first metered, or plasticizing, portion, a low-pressure portion, and second metered, or plasticizing, portion in that order from the rear end portion to the top end portion. A gas supply hole for injecting an inert gas is disposed at a position corresponding to the low-pressure portion of said screw of said screw cylinder. The inert gas is a carbon dioxide gas or a nitrogen gas having, at least in pressure, a pressure equal to or greater than a supercritical pressure or under a supercritical state. Said drive means comprise an electric servomotor.

DETAILED DESCRIPTION OF PREFERRED EMBODIMENTS

Figure 1:
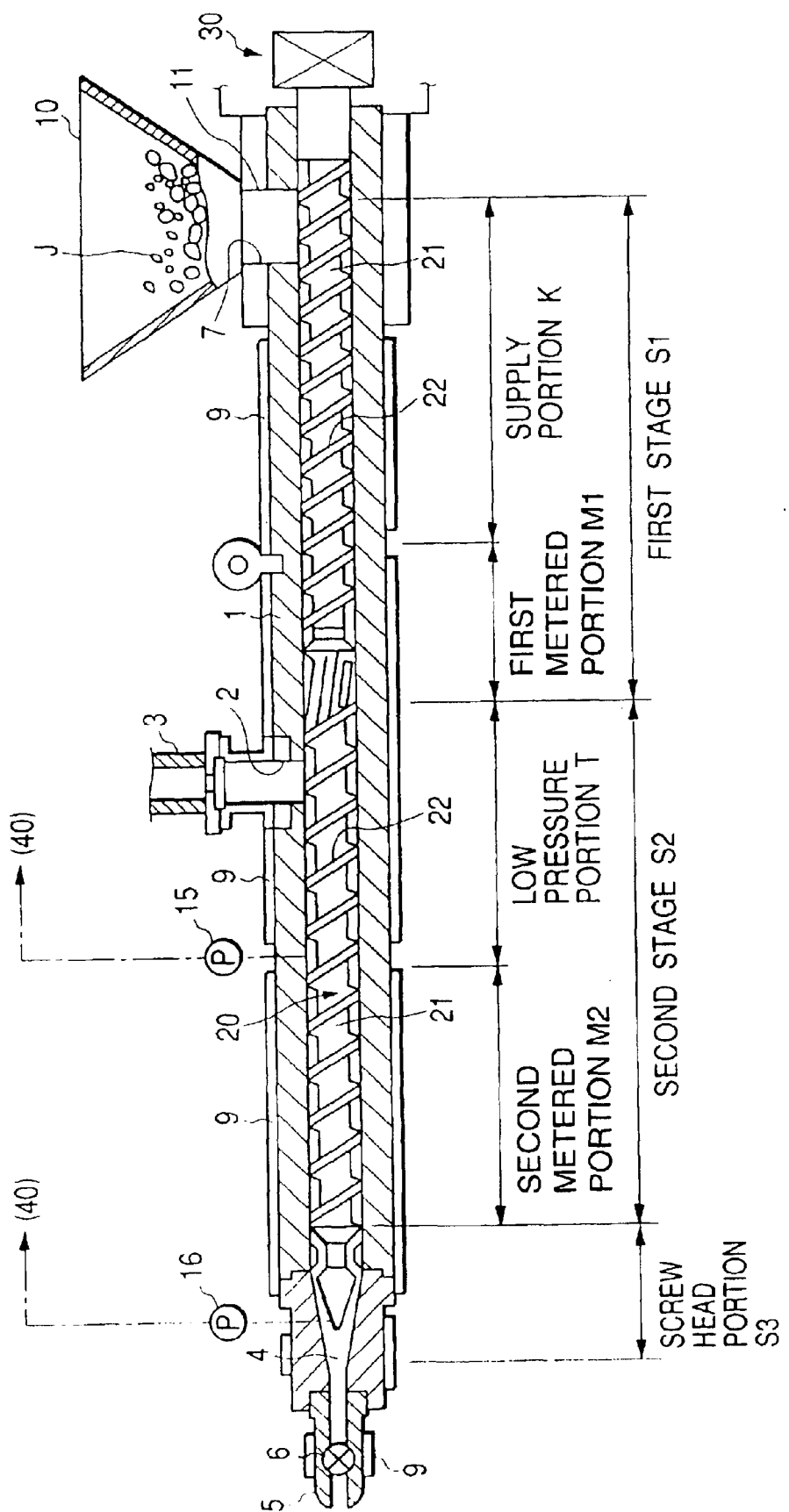
FIG. 1 is a cross-sectional schematic front view illustrating part of an apparatus for forming a thermoplastic resin foam according to an embodiment of the present invention.

First, an embodiment of an in-line apparatus for forming a thermoplastic resin foam is explained which is used for carrying out the present invention. FIG. 1 is a cross-sectional schematic front view illustrating part of the embodiment of the apparatus for forming a thermoplastic resin foam. As shown in FIG. 1, the apparatus for forming a thermoplastic resin foam according to the present embodiment comprises generally a screw cylinder 1, a screw 20, and a screw drive unit 30. Here, the screw 20 is rotatably driven into the interior of the screw cylinder 1 in the direction of plasticization, also being rotatably driven in the axial direction or the direction of injection. The screw drive unit 30 is adapted to drive the screw 20 in the direction of plasticization and in the direction of injection.

The screw cylinder 1 has a predetermined length in the axial direction and is provided with a gas supply hole 2. The gas supply hole 2 is located approximately at the middle portion of the screw cylinder 1 to reach from the outside of the screw cylinder 1 to the inside thereof. Through the gas supply hole 2, an inert gas is supplied which has a pressure equal to or greater than a supercritical gas pressure or a supercritical state. In addition, the gas supply hole 2 is hermetically connected with a gas pipe 3, which is in communication with an inert gas supply unit. In this embodiment, for example, an inert gas such as a carbon dioxide gas or a nitrogen gas is injected into a melting resin material at a pressure equal to or greater than a supercritical gas pressure of 7.4 MPa (for a carbon dioxide gas). For this reason, there are provided a compressor, a pressure control valve, and the like inside the unit for supplying an inert gas. Incidentally, the supercritical temperature of an inert gas is reached in the screw cylinder 1 when plasticization is being carried out. Therefore, when an inert gas which is at room temperature or has been preheated with waste heat is supplied directly to the screw cylinder 1, the supercritical temperature will also be reached. Thus, there is provided no additional heating unit on the inert gas supply unit. However, as a matter of course, such an inert gas can be supplied to the gas supply hole 2 that is under a supercritical state in pressure and temperature.

Figure 2:
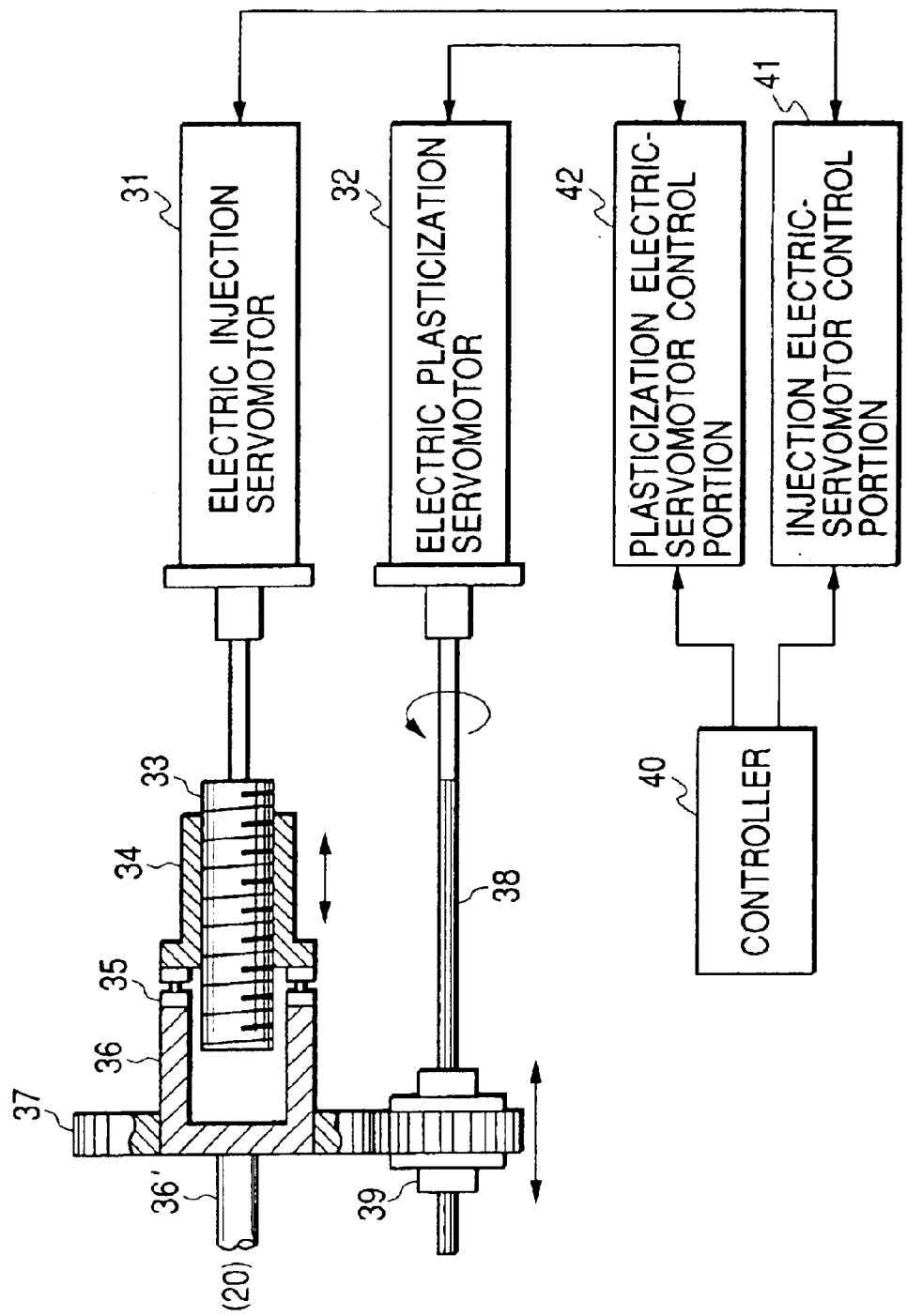
FIG. 2 is an enlarged schematic front view illustrating part of a screw drive unit of an apparatus for forming a thermoplastic resin foam according to an embodiment of the present invention.

The screw drive unit 30 is provided at the rear end portion of the screw cylinder 1. As shown in FIG. 2 with an enlarged view, the screw drive unit 30 comprises an electric injection servomotor 31 and an electric plasticization servomotor 32. A ball screw 33 is fixed to the output shaft of the electric injection servomotor 31, and a ball nut 34 is threaded over the ball screw 33. This arrangement allows the ball nut 34 to be driven in the axial direction when the electric injection servomotor 31 rotatably drives the ball screw 33. Alternatively, driving the ball nut 34 in the axial direction will cause the ball screw 33 to rotate. The ball nut 34 is connected to a drive body 36 via a thrust bearing 35. In addition, the screw 20 is connected to the top end of the output shaft 36' of the drive body 36.

There is formed a spline on the outer circumference of the rotational shaft 38 of the electric plasticization servomotor 32. A ball spline 39 is attached by insertion to the rotational shaft 38 on which the spline is formed. This arrangement prevents the ball spline 39 from moving in the rotational direction with respect to the rotational shaft 38 but allows it to freely move in the axial direction. The outer circumference of the ball spline 39 is toothed to mate with a large gear 37 that is fixed to the outer circumference of the drive body 36.

This embodiment is also provided with a controller 40 comprising a control device and a timer. The electric injection servomotor 31 is to be controlled in a predetermined manner, as described later, by means of the controller 40 via an injection electric-servomotor control portion 41. The electric plasticization servomotor 32 is also controlled in the same manner via a plasticization electric-servomotor control portion 42. A setting device installed in the controller 40 is adapted to provide the following various values required for plasticization. For example, the values include the upper and lower limits of the pressure of inert gases, timing for supplying inert gases, timer settings for stopping the supply, rotation speeds of the electric servomotors 31, 32 of the screw drive unit 30, and back-pressures for plasticization. The values also include the temperature of the heaters 9, which are provided on the outer circumference of the screw cylinder 1 and an injection nozzle 5. The electric servomotors 31, 32 are to be controlled with the controller 40, for example, by feedback control so as to maintain the aforementioned various types of values to the predetermined settings.

Referring to FIG. 1, there is shown a measurement chamber 4 to the left of the screw cylinder 1 near the top end portion thereof, and the injection nozzle 5 is provided at the top end portion. The injection nozzle 5 is provided with a shut-off valve 6. On the outer circumference of the screw cylinder 1 and the injection nozzle 5, a plurality of heaters 9 are provided, the temperature of each of which is controlled. Thus, for example, a temperature of 100° C. or more, which is equal to or greater than a supercritical temperature, is maintained inside the screw cylinder 1. In addition, there is provided a first pressure gauge 15 downstream of the gas supply hole 2 of the screw cylinder 1. There is also provided is a second pressure gauge 16 in the measurement chamber 4. The pressure measurements provided by these pressure gauges 15, 16 are to be inputted to the controller 40. Incidentally, in FIG. 2, the electric injection servomotor 31 is adapted to rotate slightly in the forward and reverse directions during plasticization to apply fine vibration to the screw 20 in the direction of injection.

In this embodiment, a controlled amount of a thermoplastic resin material J is to be supplied to the screw cylinder 1. FIG. 1 shows a supply cylinder 11 of a hopper 10 being directly connected to a material supply hole 7 of the screw cylinder 1. Controlling the rotational speed of the screw is to control the amount of the thermoplastic resin material J that is supplied from the hopper 10 to the screw cylinder 1 and thus control the amount of melting resin at a low pressure portion T, described later.

The screw 20 moves in the axial direction upon plasticization and injection. As shown in FIG. 1, the rear end portion of the screw 20 is a first stage S1 and the top end portion thereof is a second stage S2, corresponding to the screw cylinder 1 to some extent. The first stage S1 comprises a supply portion K and a first metered (plasticizing) portion M1 after or downstream of the supply portion K. The supply portion K corresponds to the material supply hole 7 of the screw cylinder 1 and has a comparatively deep screw groove 21. The screw groove 21 changes gradually in depth from the groove of the supply portion K to the groove of the first metered (plasticizing) portion Ml, the screw groove 21 of the first metered portion Ml being shallower in depth. The thermoplastic resin material J fed from the supply portion K by the rotation of the screw 20 melts, while being subjected to heat provided by the heaters 9 installed on the screw cylinder 1, compression, and shearing. Thus, the thermoplastic resin material J melts completely at the first metered portion Ml. This prevents leakage of an injected inert gas toward the supply portion K. That is, the melted resin provides for sealing.

The second stage S2 comprises the low-pressure portion T located after the first stage S1 and a second metered (plasticizing) portion M2 downstream thereof. The screw groove 21 of the low-pressure portion T is deeper. This causes a reduction in pressure of the melted resin fed from the first stage S1 to keep the low-pressure portion T at a low pressure even when filled with the melted resin. In some cases, a starved feed portion is produced. Consequently, it is made easy to inject an inert gas to the low-pressure portion T. In addition, the low-pressure portion T is adapted to have a length enough to cover the gas supply hole 2 when the screw 20 has moved in the axial direction. The screw groove 21 of the second metered portion M2 is shallow in depth, being filled with the melted resin. This allows the inert gas injected to be sealed with the melted resin of the second metered portion M2.

Incidentally, in the aforementioned embodiment, the screw groove 21 of the low-pressure portion T of the screw 20 becomes deeper in depth to provide an increased volume between flights 22 and 22. It is also possible, however, to provide an increased volume between the flights 22 and 22 by narrowing the width of the flights 22 instead of making the screw groove 21 deeper. Moreover, it is also possible to provide an increased volume between the flights 22 and 22 by widening the pitch of the flights 22, 22. Moreover, it is obvious that the screw groove 21 can be made deeper in depth and the flights 22, 22 can be narrowed in width to widen the pitch of the flights 22, 22.

Now, another example is explained below, in which the aforementioned apparatus for forming a thermoplastic resin foam is employed. First, the thermoplastic resin material J is put into the hopper 10. The completion time of plasticization is set such as to the position of the screw 20 with the setting device provided on the controller 40. It is also programmed to brake the electric plasticization servomotor 32 and the electric injection servomotor 31 when the completion time of plasticization is detected which has been set. In addition, various values necessary for plasticization are set. These values include the upper and lower pressure limits of the inert gas, the pressure of the second metered portion M2, the pressure inside the measurement chamber 4, the temperature of the heaters 9, and the rotational speed of the screw 20. Then, the shut-off valve 6 is closed to drive the screw. The thermoplastic resin material J is then supplied to the screw cylinder 1 at the pre-set ratio. The electric plasticization servomotor 32 is activated to allow the rotational shaft 38 to rotate. This causes the large gear 37 to be driven via the ball spline 39, and thus the screw 20 is rotatably driven at a predetermined speed. While being fed by the rotation of the screw 20, the thermoplastic resin material J supplied from the hopper 10 melts by the heat applied from outside and produced by the shearing and frictional effects of the rotation of the screw 20, as conventionally known. Thus, the thermoplastic resin material J is fed to the first metered portion M1, where it melts completely. Then, it is fed to the second stage S2. At this time, the temperature inside the screw cylinder 1 has reached the supercritical temperature of the inert gas, for example, a temperature of 100□ C. or more. Accordingly, the thermoplastic resin material J is accumulated in the measurement chamber 4 at the front of the screw cylinder 1. The screw 20 will retreat due to the pressure of the resin in proportion to the amount of the resin accumulated. The retreat of the screw 20 will cause the drive body 36 and the ball nut 34 to retreat. The ball screw 33 will rotate against the pre-set torque of the electric injection servomotor 31. This thereby provides a predetermined back pressure.

When the timer of the controller 40 has counted to the pre-set time upon measurement in the foregoing, an inert gas is injected from the gas supply hole 2 to the low-pressure portion T of the second stage S2. The inert gas is a gas under the supercritical state such as a carbon dioxide gas or a nitrogen gas, or a gas at a pressure equal to or greater than the supercritical pressure. The melted resin in the first metered portion M1 prevents the leakage of the injected inert gas toward the supply portion K. In addition, upon injection of the gas, the screw groove 21 of the low-pressure portion T is made deeper and the pressure of the melted resin made lower. This makes it possible to inject the inert gas at a comparatively low pressure of about a few Mpa to 20 MPa, which is equal to or greater than the supercritical pressure. The injected inert gas is at a supercritical temperature, for example, a temperature equal to or greater than 100□ C. in the screw cylinder 1. This makes it easy for the inert gas to permeate the melted resin by the rotation of the screw 20. Thus, the thermoplastic resin material J is fed to the second metered portion M2 metered portion M2 of the second stage S2. During this step, the inert gas is supplied so as not to prevent the second metered portion M2 from being lowered below the supercritical pressure. Here, the melted resin in the second metered portion M2 prevents the forward leakage of the injected inert gas. The timing for supplying and stopping the inert gas can also be controlled with the position of the resin being measured.

The melted resin, which the inert gas has permeated, is fed to the measurement chamber 4. As measurement proceeds, the screw 20 retreats backward by the pressure of the resin measured. At this time, the pressure of the measurement chamber 4 is measured with the second pressure gauge 16. A pressure is applied to the screw 20 in the direction of injection for measurement so as not to allow the measured pressure to go below the supercritical pressure. Thus, the back pressure is required to be the supercritical pressure or greater. When the screw 20 has retreated a predetermined amount, this is detected and the measurement is completed.

After the measurement has been completed, this is detected to apply the brake to the electric injection servomotor 31. The brake is also applied to the electric plasticization servomotor 32. This prohibits the rotation of the ball screw 33 to prevent the screw 20 to retreat due to the pressure of the melted resin. Consequently, the melted resin in which the inert gas has been dispersed is prevented from being reduced in pressure to prevent foaming inside the screw cylinder 1. Thus, the melted resin is allowed to foam inside a mold to provide a fine thermoplastic resin foam. Incidentally, the aforementioned effect can also be obtained by applying the brake to the members associated with the screw 20 instead of the electric injection servomotor 31 to prevent the rearward movement of the screw 20. Therefore, application of brake to the electric injection servomotor 31 includes the application of brake to the members associated with the screw 20.

Now, the thermoplastic resin material J finds itself in the injection step. The electric injection servomotor 31 is activated to rotatably drive the ball screw 33, then the ball nut 34 being driven in the axial direction. This causes the drive body 36 to be driven in the axial direction and the screw 20 to be driven in the direction of injection. The shut-off valve 6 is opened to inject the thermoplastic resin material J to a mold (not shown). The inert gas is kept being supplied during the injection step. When the time has counted to the pre-set time, the injection is stopped. The mold is opened after the resin injected into the mold has cooled and solidified. Thus, a thermoplastic resin foam is provided which has an average cell diameter of 0.01 to 50 $\mu$m and an average cell density of $10^8$ to $10^{16}$ pieces/cm$^3$. Hereinafter, molding is repeated in the same manner. The inert gas can also be injected only during plasticization.

This embodiment also allows molding to be carried out in a way other than the aforementioned one by setting molding conditions different from the aforementioned ones to the controller 40. For example, it is also allowed to set all the conditions in the same way except that the electric plasticization servomotor 32 performs plasticization immediately before the injection step by means of the electric injection servomotor 31. This allows the screw 20 to retreat providing no time for reduction in pressure inside the screw cylinder 1, thereby preventing foaming inside the screw cylinder 1. It is also allowed to drive the screw 20 at low speed in the direction of plasticization from the end of the plasticization step until the injection step is initiated. This obviously makes it possible to prevent a reduction in pressure inside the screw cylinder 1.

Suppose that the pressure of the screw cylinder 1, detected with the first and second pressure gauges 15, 16, is inputted into the controller 40 and the detected pressure has reduced to the pre-set lower limit. In this case, the electric plasticization servomotor 32 can also be controlled to be activated to drive the screw 20 in the direction of plasticization and then stopped when the pre-set pressure has been reached. This also prevents the foaming inside the screw cylinder 1. In addition, although the electric plasticization servomotor 32 is frequently driven in the forward direction along the direction of plasticization in general, a small step of reverse rotation may be incorporated into the forward rotation. That is, the screw 20 can be rotated in the reverse direction to produce dense and non-dense portions, facilitating permeation and dispersion of the inert gas in the melted resin.

As described above, according to the present invention, the screw is selected, corresponding to the screw cylinder, as the first plasticizing portion, the low-pressure portion, and the second plasticizing portion, from the rear to the front end portion. The gas supply hole is provided at the position corresponding to said low-pressure portion of the screw on the screw cylinder. This provides an effect of injecting easily into the screw cylinder an inert gas having a pressure equal to or greater than the supercritical pressure or an inert gas under the supercritical state. The gas supply hole is located between the first and second plasticizing portions. At this time, this provides accordingly such an effect that the injected inert gas is sealed with the melted resin at the first and second plasticizing portions. In addition, a drive means for driving the screw in the directions of plasticization and injection comprises electric servomotors. This allows for composite operation of the screw during molding, especially during the plasticization step. Thus, such an effect unique to the present invention is provided that foaming can be prevented inside the screw cylinder to provide a high-quality thermoplastic resin foam.

In addition, after the plasticization step, the following inventions make it possible to prevent a reduction in pressure of the melted resin in which the inert gas has been dispersed inside the screw cylinder. Here, the inventions include the invention of preventing the screw from retreating by applying brake to the electric servomotor, and the invention of performing the plasticization step immediately before the injection step. The inventions also include the invention of driving the screw at low speed in the direction of plasticization until immediately before the injection step is initiated. Also included is the invention of driving the screw in the direction of measurement when the pressure has reduced below the pre-set value inside the screw cylinder or of stopping the screw when the pre-set pressure has been reached. Thus, such an effect unique to the aforementioned inventions can be obtained that the foaming is prevented inside the screw cylinder to provide a fine high-quality thermoplastic resin foam. Furthermore, upon driving the screw in the direction of plasticization, an effect of accelerating the permeation and making uniform dispersion of the inert gas in the melted resin can be obtained by the following invention. That is, the invention of combining intermittently the driving of the screw in the direction of plasticization with the driving of the screw in the reverse direction of plasticization, or rotating the screw cylinder in the backward direction during plasticization provides the same effect. On the other hand, such an effect can be further obtained in addition to the aforementioned effect of preventing the foaming inside the screw cylinder, and accelerating the permeation and producing uniform dispersion of the inert gas in the melted resin in the following invention. The additional effect provided by the following invention is that the inert gas can be easily injected into the screw cylinder to seal the injected inert gas with the melted resin in the first and second metered portions. The invention is limited among the aforementioned inventions in that an inert gas, at least in pressure, equal to or greater than the supercritical pressure or under the supercritical state is injected to the position corresponding to the low-pressure portion of said screw of the screw cylinder. Here, said screw is employed which is selected as the first metered portion, the low-pressure portion, and the second metered portion.

What is claimed is:

1. A method for forming a thermoplastic resin foam comprising the steps of:

plasticizing a thermoplastic resin material by rotatably driving a screw provided drivably in a direction of plasticization and injection inside a screw cylinder, injecting melted resin, permeated by an inert gas, into a mold by driving said screw in the direction of injection after having injected the inert gas such as a carbon dioxide or a nitrogen gas having, at least in pressure, a pressure equal to or greater than a supercritical pressure or the inert gas under a supercritical state into said screw cylinder to allow the inert gas to permeate melted resin, wherein an electric servomotor is used as a drive means for driving said screw in the direction of plasticization and injection, wherein the step of plasticizing the thermoplastic resin material is performed until immediately before the step of injecting the melted resin is initiated, wherein a controller is provided with a setting device which includes pressure at a pre-set value for the screw cylinder, and when a pressure has dropped below the pre-set value inside said screw cylinder, the controller causes the electroservomotor to drive said screw in the direction of plasticization and to stop said screw when the pressure becomes equal to or greater than the pre-set value in order to maintain the pressure at a supercritical pressure or more inside said screw cylinder.

2. A method for forming a thermoplastic resin foam as claimed in claim 1, wherein after the step of plasticizing the thermoplastic resin material has been completed, said screw is prevented from retreating by applying brake to said electric servomotor to maintain a pressure at a supercritical pressure or more inside said screw cylinder.

3. A method for forming a thermoplastic resin foam according to claim 2, wherein said screw corresponds to said screw cylinder and is selected as a first metered portion, a low-pressure portion, and second metered portion, in order from a rear end portion to a top end portion of said screw; and further comprising:

an inert gas having, at least in pressure, a pressure equal to or greater than a supercritical pressure or an inert gas under a supercritical state is injected into a position corresponding to the low-pressure portion of said screw of said screw cylinder.

4. A method for forming a thermoplastic resin foam as claimed in claim 1, wherein during plasticization, said screw cylinder is provided with micro-vibration in the direction of injection.

5. A method for forming a thermoplastic resin foam according to claim 4, wherein said screw corresponds to said screw cylinder and is selected as a first metered portion, a low-pressure portion, and second metered portions in thatorder from a rear end portion to a top end portion of said screw; and further comprising:

an inert gas having, at least in pressure, a pressure equal to or greater than a supercritical pressure or an inert gas under a supercritical state is injected into a position corresponding to the low-pressure portion of said screw of said screw cylinder.

6. A method for forming a thermoplastic resin foam according to claim 1, wherein said screw corresponds to said screw cylinder and is selected as a first metered portion, a low-pressure portion, and second metered portions in order from a rear end portion to a top end portion of said screw; and further comprising:

an inert gas having, at least in pressure, a pressure equal to or greater than a supercritical pressure or an inert gas under a supercritical state is injected into a position corresponding to the low-pressure portion of said screw of said screw cylinder.

7. A method for forming a thermoplastic resin foam comprising the steps of:

plasticizing a thermoplastic resin material by rotatably driving a screw provided drivably in a direction of plasticization and injection inside a screw cylinder, injecting melted resin, permeated by an inert gas, into a mold by driving said screw in the direction of injection after having injected the inert gas such as a carbon dioxide or a nitrogen gas having, at least in pressure, a pressure equal to or greater than a supercritical pressure or the inert gas under a supercritical state into said screw cylinder to allow the inert gas to permeate melted resin, wherein an electric servomotor is used as a drive means for driving said screw in the direction of plasticization and injection, wherein even after the step of plasticizing the thermoplastic resin material has been completed, said screw is driven at low speeds in the direction of plasticization until immediately before the step of injecting the melted resin is initiated.

8. A method for forming a thermoplastic resin foam according to claim 7, wherein said screw corresponds to said screw cylinder and is selected as a first metered portion, a low-pressure portion, and second metered portions, in that order from a rear end portion to a top end portion of said screw; and further comprising:

an inert gas having, at least in pressure, a pressure equal to or greater than a supercritical pressure or an inert gas under a supercritical state is injected into a position corresponding to the low-pressure portion of said screw of said screw cylinder.

9. A method for forming a thermoplastic resin foam comprising the steps of:

plasticizing a thermoplastic resin material by rotatably driving a screw provided drivably in a direction of plasticization and injection inside a screw cylinder, injecting melted resin, permeated by an inert gas, into a mold by driving said screw in the direction of injection after having injected the inert gas such as a carbon dioxide or a nitrogen gas having, at least in pressure, a pressure equal to or greater than a supercritical pressure or the inert gas under a supercritical state into said screw cylinder to allow the inert gas to permeate melted resin wherein an electric servomotor is used as a drive means for driving said screw in the direction of plasticization and injection, wherein the step of plasticizing the thermoplastic resin material is performed until immediately before the step of injecting the melted resin is initiated, wherein when said screw is driven in the direction of plasticization, driving said screw in the opposite direction of plasticization is intermittently combined therewith.

10. A method for forming a thermoplastic resin foam according to claim 9, wherein said screw corresponds to said screw cylinder and is selected as a first metered portion, a low-pressure portion, and second metered portion, in order from a rear end portion to a top end portion of said screw; and further comprising:

an inert gas having, at least in pressure, a pressure equal to or greater than a supercritical pressure or an inert gas under a supercritical state is injected into a position corresponding to the low-pressure portion of said screw of said screw cylinder.

* * * * *